United States Patent [19]

Johnson et al.

[11] Patent Number: 5,034,907
[45] Date of Patent: Jul. 23, 1991

[54] DYNAMICALLY CONFIGURABLE SIGNAL PROCESSOR AND PROCESSOR ARRANGEMENT

[75] Inventors: Brian C. Johnson, Stamford, Conn.; Carlo Basile, Flushing; Amihai Miron, Ossining, both of N.Y.; Neil H. E. Weste, North Andover, Mass.; Christopher J. Terman, Newton Centre, Mass.; Judson Leonard, Waban, Mass.

[73] Assignee: North American Philips Corporation, New York, N.Y.

[21] Appl. No.: 614,043

[22] Filed: Nov. 9, 1990

Related U.S. Application Data

[63] Continuation of Ser. No. 406,203, Sep. 12, 1989, abandoned.

[51] Int. Cl.⁵ .............................................. G06F 15/31
[52] U.S. Cl. ............................ 364/724.16; 364/724.13
[58] Field of Search ....................... 364/724.13, 724.16, 364/724.01

[56] References Cited

U.S. PATENT DOCUMENTS

| | | | |
|---|---|---|---|
| 3,629,509 | 12/1971 | Glasser | 364/724.13 X |
| 4,389,538 | 6/1983 | White | 364/724.13 X |
| 4,393,456 | 7/1983 | Marshall, Jr. | 364/724.13 |
| 4,450,533 | 5/1984 | Petil et al. | 364/724.13 X |
| 4,691,292 | 9/1987 | Rothweiler | 364/724.13 |
| 4,701,874 | 10/1987 | Akai et al. | 364/724.13 X |
| 4,701,956 | 10/1987 | Katoh | 364/724.13 X |
| 4,777,612 | 10/1988 | Tomimitsu | 364/724.13 |

OTHER PUBLICATIONS

A 1-GOPS CMOS Programmable Video Signal Processor by Takao Yamazaki et al, 1989 IEEE International Solid State Circuits Conference, pp. 164-165 and 326.

Developments in Integrated Digital Signal Processors, and the PCB 5010 by J. L. van Meerbergen, Philips Technical Review, vol. 44, No. 1, Mar. 1988.

*Primary Examiner*—Dale M. Shaw
*Assistant Examiner*—Tan V. Mai
*Attorney, Agent, or Firm*—Michael E. Marion

[57] ABSTRACT

A programmable digital signal processor usable in a variety of configurations and controlled by stored coefficients and control words which are addressable to be provided to a plurality of processing sections as often as once per clock cycle. The processor arrangement is suitable for use as a decoder of multiple analog component (MAC) television signals.

9 Claims, 7 Drawing Sheets

DYNAMICALLY CONFIGURABLE SIGNAL PROCESSOR AND PROCESSOR ARRANGEMENT

This is a continuation of application Ser. No. 07/406,203 filed Sept. 12, 1988, now abandoned.

BACKGROUND OF THE INVENTION

The desire to integrate a number of signal processing functions into a single circuit package, utilizing for example VLSI techniques, has fostered the development of multi-purpose processors which can be configured to perform particular processing functions through appropriate commands or control signals.

The PCB 5010 digital signal processor is essentially a computer on a chip designed for processing digital signals and is described in the Philips Technical Review, Vol. 44, No. 1, March 1988, which is incorporated by reference herein. The PCB 5010 operates in response to programmed instruction which select coefficients affecting the nature of the processing taking place within the chip. A CMOS Programmable Video Signal Processor, described at the 1989 I.E.E.E. Solid State Circuits Conference, similarly can be programmed to perform video processing functions such as FIR filtering, interpolation, decimation and matrix vector multiplication. Neither of these devices however can be reprogrammed with different coefficients or otherwise reconfigured as often as every clock cycle. This limits their usefulness in applications where the reconfiguration of the processor must take place rapidly during the processing of the signal.

The object of the present invention is to provide a multi-function digital processing system which can be dynamically reprogrammed to perform a different processing function or implement a different processing characteristic as frequently as every clock cycle.

SUMMARY OF THE INVENTION

The invention comprises a programmable digital signal processor (DSP) whose function and characteristics can be changed as frequently as every clock cycle. The invention can be used to implement a variety of digital processing functions, for example, horizontal FIR filtering, vertical FIR filtering, two-dimensional FIR filtering comprising both horizontal and vertical filtering, resampling which can be used for decimation or interpolation, and transform processing.

Intermediate arithmetic results can be calculated to full precision, however a final sum can optionally be shifted and clipped before it is presented to the outputs in order to provide a limiting function to the output signal. Two or more DSPs can be coupled together to form more complex devices.

The invention also comprises a processor arrangement which is suitable for use in a multiple analog component (MAC) television signal processing system. The two-line MAC system (HDMAC-60) for providing a High Definition Television (HDTV) display, which is described in U.S. patent application No. 077,557 filed July 24, 1987, U.S. Pat. No. 4,908,697, is incorporated by reference herein. HDMAC-60 signal components, for example, luminance, chrominance and line difference signals, undergo various pre-transmission processes such as compression, expansion and pre-filtering, which must be compensated for using post-transmission processes during decoding. Since each component is processed differently, conventional MAC encoding/decoding schemes utilize different processing devices and signal paths for the various signal components. The present invention minimizes the number of devices and paths needed because the processor arrangement of the present invention can be configured to operate in a desired fashion for each of the MAC components as the components occur in time on the time multiplexed MAC signal, thereby minimizing the number of devices and circuit paths required.

It is a feature of the present invention that it provides a DSP comprising a plurality of dynamically configurable processing sections. It is a further feature of the invention that each of the sections can be programmed to control their respective processing functions resulting in dynamic control of the data pipeline through, and the interaction between the sections and hence the overall operation and processing function of the DSP. It is a still further feature that each section can be programmed with a variety of different coefficients which are alternatively used to modify the various respective signal components being processed through each particular section. It is a further feature of the invention that it comprises means for dynamically changing control words and coefficients as frequently as every clock cycle. It is another feature of the invention that it comprises a processor arrangement which can be used to process complex, multicomponent signals, for example MAC signals.

BRIEF DESCRIPTION OF THE DRAWINGS

Other objects, features and advantages of the present invention will become more fully apparent from the following detailed description of the preferred embodiments, the appended claims and the accompanying drawings in which:

FIG. 2b is a memory map of the RAM block of the controller shown in FIG. 2a.

FIG. 5b is a more detailed block diagram of a portion of the line buffer shown in FIG. 5a.

DETAILED DESCRIPTION OF A PREFERRED EMBODIMENT OF THE INVENTION

The invention comprises a dynamically configurable digital signal processor (DSP) and a processing arrangement comprising at least one DSP. The embodiments illustrated herein by way of example in FIGS. 1-5b describe embodiments of a DSP and a MAC decoder comprising an arrangement of DSPs, each of which performs a variety of signal processing functions which can change dynamically with the time multiplexed signal being processed.

Coefficients and control words are written into memory means within the DSP(s) either initially (for example at power up) or periodically (for example during the vertical interval of a MAC type television signal).

During the processing of a signal by the DSP, address locations in the memory means are accessed with each clock cycle or group of cycles. Each address location contains either coefficients or control words which are provided to respective tap sections In this manner, the function provided by, and characteristics of, the DSP can change dynamically as often as each clock cycle. This will also be referred to herein as changing the characteristics of the DSP and/or processor arrangement "on the fly".

Figure 1:
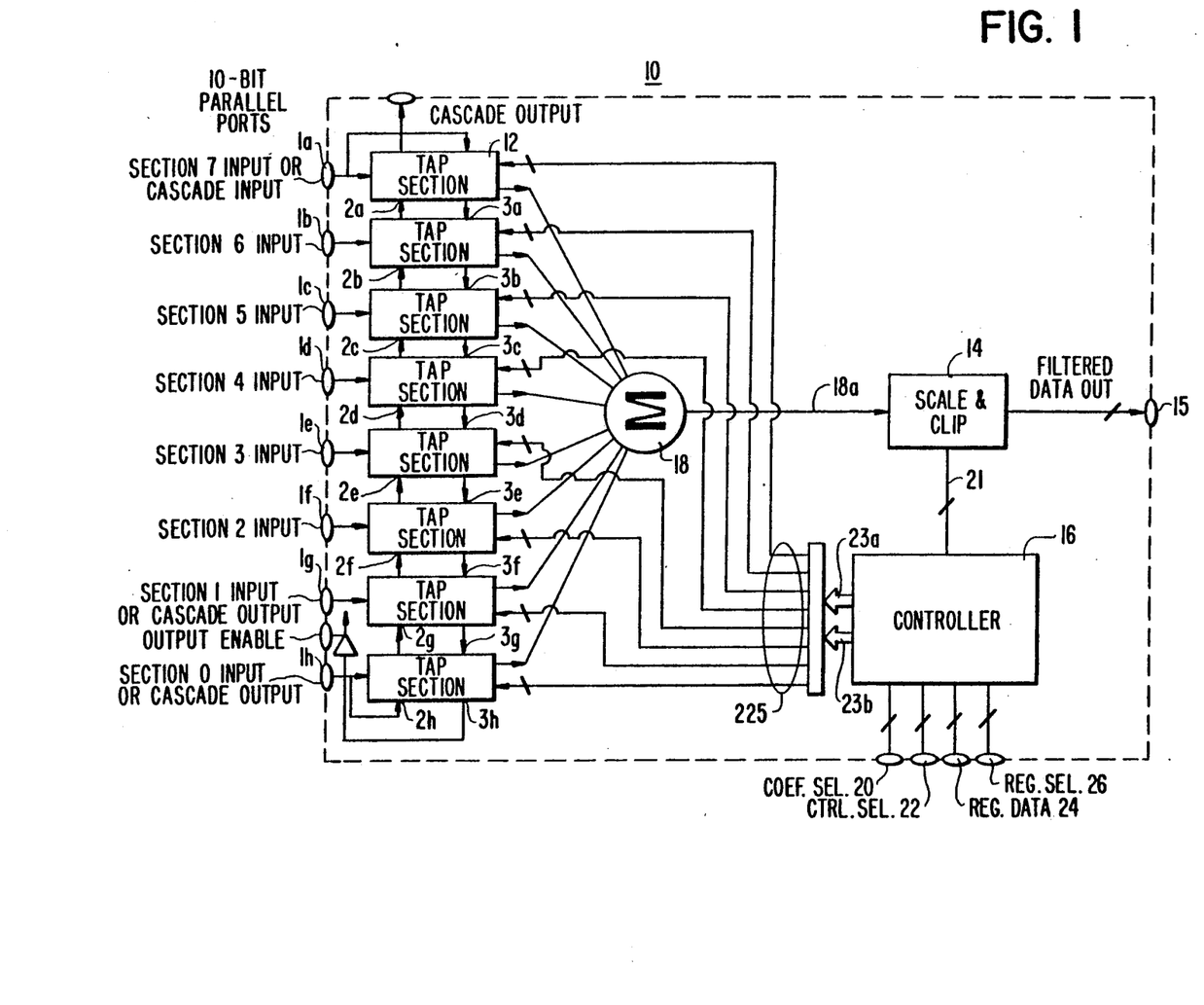
FIG. 1 is a block diagram of one embodiment of a DSP comprising the invention.

The embodiment of the DSP 10 shown in FIG. 1 utilizes eight configurable tap sections having for example 10-bit-wide data paths. The tap sections will all be represented herein with reference to the tap section labelled 12. It is to be understood however that the number of tap sections and the word length and configuration of data ports, buses and memory means described herein, can be varied and still remain within the scope of the invention.

Each tap section 12 has a first data input (1a-1h), a second data input (2a-2h) coupled to the adjacent tap section below it and a third data input (3a-3h) coupled to the adjacent tap section above it. The structure of each tap section 12 is shown in greater detail in FIG. 2.

As will described in more detail below, memory means are provided in the controller 16 of DSP 10 for storing multi-bit coefficients and control words which are provided to the tap sections via bus 25. The coefficients and control words for each tap section necessary to configure the DSP 10 to perform a desired processing function are read from and provided by, the memory means, to each respective tap section, as often as every clock cycle.

By utilizing "pipelined" architecture the DSP 10 can operate at high speeds, for example at a clock rate of more than 40 MHZ. With pipelined architecture, a new operation starts while other parts of the previous operation are still being performed at other locations within the circuit during the same machine cycle.

Figure 2:
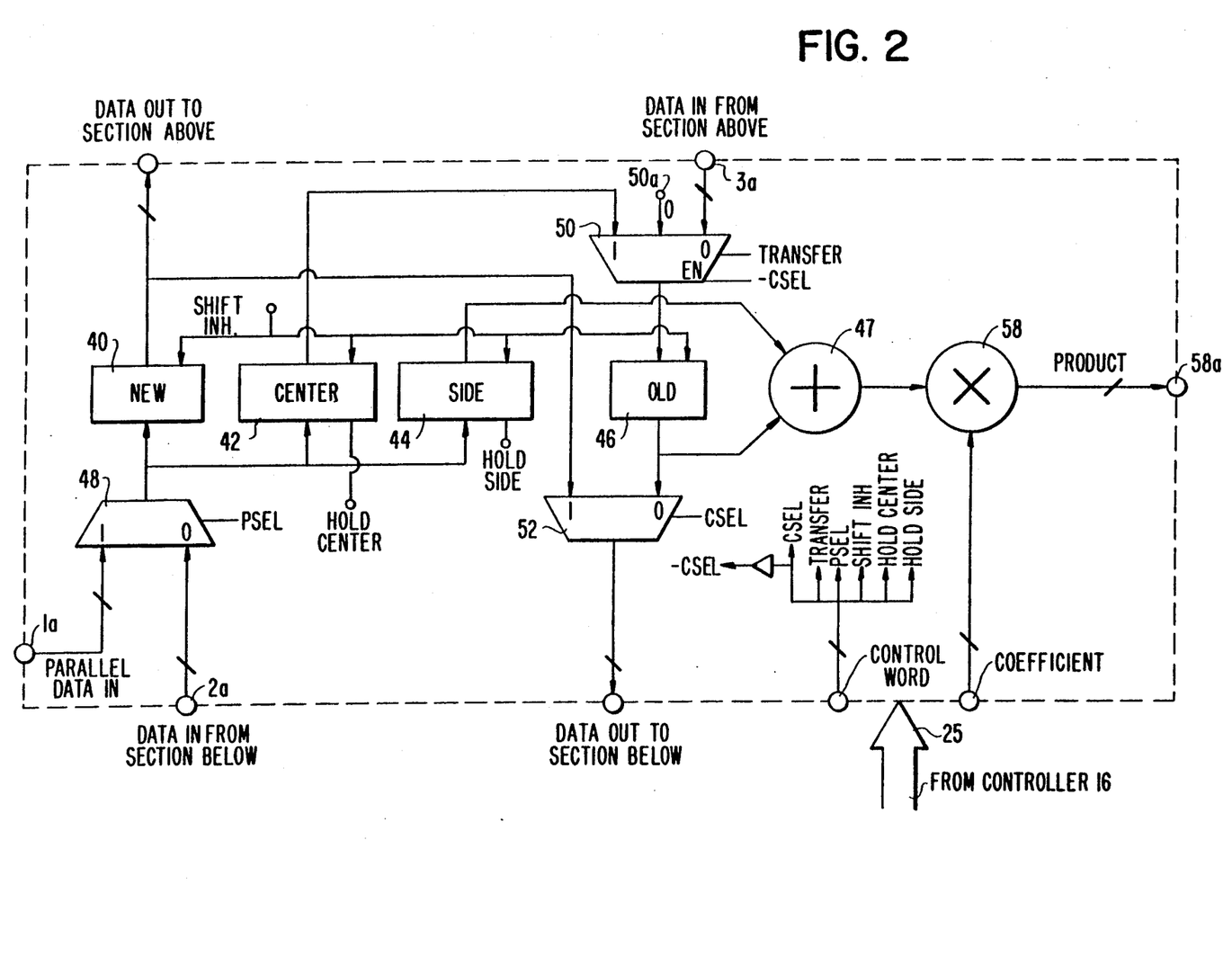
FIG. 2 is a block diagram of a tap section of the DSP shown in FIG. 1.

Each tap section 12 comprises four data registers 40, 42, 44 and 46 labelled "new", "center", "side" and "old" respectively, for convenience. Three multiplexers 48, 50 and 52 provide flexibility in configuring the data path within each tap section 12 and therefore throughout the DSP 10.

Figure 2A:
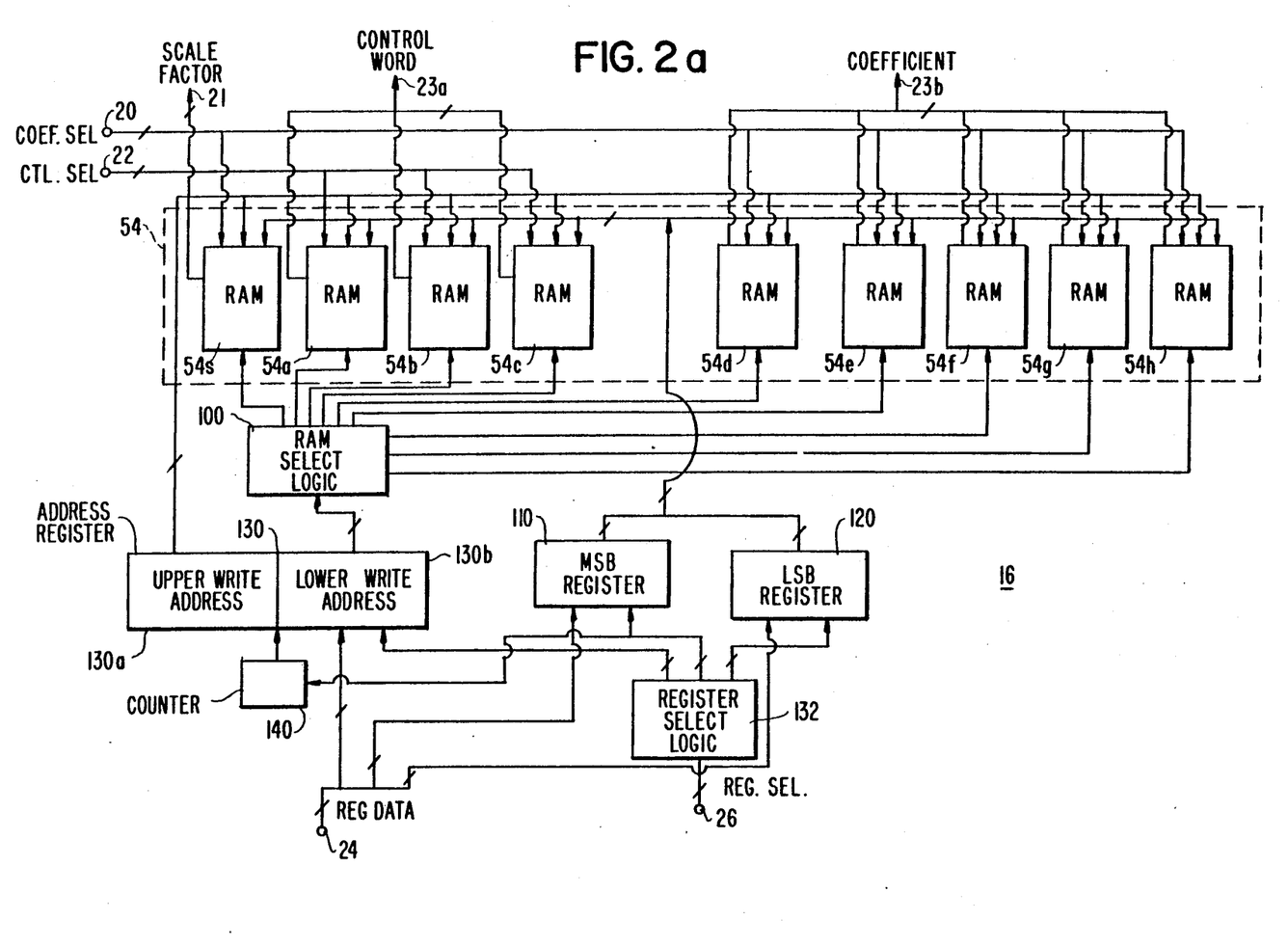
FIG. 2a is a block-diagram of the controller of the DSP shown in FIG. 1.

FIG. 2a is a block diagram of the controller 16. It comprises a memory means 54 assembled for example, from nine 16 by 16 dual port RAMs. RAMs 54a-54c are configured to store control words. These control words are provided as an output from controller 16 by bus 23a. RAMs 54a-54c together hold sixteen 48 bit words. Each 48 bit word is divided into eight 6 bit control words, each of which are directed over respective lines of bus 25 to a different tap section (sections 0 thru 7). RAMs 54d-54h are configured to store coefficients. These coefficients are provided as an output from controller 16 by bus 23b. RAMs 54d-54h hold sixteen 80 bit words. Each 80 bit word is divided into eight 10 bit coefficients, each of which is directed over respective lines of bus 25 to a different tap section (sections 0-7). One RAM 54s is configured to store sixteen 3 bit scale factors which are provided to scale & clip means 14 by bus 21. Each of the sixteen scale factors, coefficients and control words are in addressable locations in the RAM block 54. If an address location is provided to coefficient select port 20, the coefficients stored at that row location of the appropriate RAMs will be read by the tap sections over respective lines of bus 25. If an address location is provided to control select port 22, the control words stored at that row location of the appropriate RAMs will be transferred to the tap sections over respective lines of bus 25. Similarly the scale factor stored in RAM 54s will be read by scale and clip means 14.

Processing sequence

Operation of each tap section 12 is controlled by six control signals. Each of these control signals is represented by one bit of the six bit control word provided to each tap section from controller 16.

The six control signals are:

Shift-Inhibit: This signal is a hold control for all four data registers. When enabled, the data registers will be held rather than loaded with the selected input data on the next rising edge of a clock signal. It is possible to "stall" the flow of data through the DSP for the next cycle by enabling Shift-Inhibit during the current cycle. One may wish to enable Shift-Inhibit if new data samples are not available every clock cycle.

Hold-Side: This signal is a hold control for the Side data register 44 whose input is from the data stream via parallel input 49b or input from adjacent section 49a as selected by multiplexer 48, and whose output is one of the two inputs to adder 47. In normal operation, this signal is not enabled; however, by enabling Hold-Side in the cycle after the final sample of a data stream enters the data pipeline, it is possible to change data streams "on-the-fly" without having to first drain the data pipeline, and without interaction between the "old" data stream coming from old data register 46 and the "new" data stream coming from the multiplexer 48. While Hold-Side is enabled in one section of a DSP 10, elements of a "new" stream can shift through other tap sections, but the tap section outputs behave as if the final sample of the "old" stream were replicated indefinitely. In order to efficiently utilize control memory it is possible to propagate the Hold-Side signal from tap to tap following the final sample of the "old" data stream. This will minimize the number of control words used. To do this, Hold-Side is enabled for the first tap section of a DSP 10 only and later tap sections receive delayed copies of the final sample using appropriate transfer circuitry. Propagation of the delayed copies is halted at any tap section in which Csel is enabled, and the delayed copies are cleared when Transfer is enabled.

Hold-Center: This signal is a hold control for the center data register 42 which is used when initializing a tap section or when changing data streams in conjunction with changes in the input signal to DSP 10 i.e. "on the fly". If the DSP 10 is to be configured to operate as a symmetric filter, the first sample value of a "new" data stream is saved in the center data register 42 as it passes through each tap section by enabling Hold-Center for each tap section of the filter on the cycle in which the first sample value of the input signal to be processed enters the tap section. On the cycle when the first data sample reaches the center tap section of the filter, all the tap sections downstream from the center section (i.e., present in the Old data registers 46 of each section) can be initialized simultaneously with their copy of the first data value by enabling Transfer for all the tap sections during that cycle. The filter now behaves as if it had been processing a constant waveform equal to the first data sample, thus avoiding any ringing, etc. due to a startup transient. This signal may be automatically propagated to later tap sections as was described previously for the Hold-Side signal. In this case Hold-Center would be enabled in the first tap section when the first "new" data sample enters the data pipeline.

Transfer: This signal is used to choose the input for old data register 46 and to clear propagated copies of Hold-Side and Hold-Center if propagation has been implemented as described above. In the normal operation of a DSP 10 configured as a symmetric filter, if Transfer is not enabled, the old data register 46 is loaded with data from the section above via input 46a. If the Transfer is enabled the old data register 46 will be loaded from the center data register 42.

Psel: This signal enables selection of a parallel data input. When enabled, input to multiplexer 48 not from the tap section below via input 2a, but rather from the parallel data input 1a. Psel would be enabled for the first tap section of a DSP 10 configured as a horizontal filter, or if this tap section is being used to provide an appropriately weighted input directly to the summing network 18.

Csel: This signal configures the tap section as a center tap for a symmetric filter. When enabled, multiplexer 50 will select the zero input 50a and the output of the old data register 46 will become zero (effectively making the contents of the side data register 44 the input to the multiplier 58). The contents of the new data register 40 will be directed to the tap section below via multiplexer 52. One would enable Csel for the center tap section of a DSP 10 configured as a symmetric horizontal filter, any tap section of a DSP 10 configured as a nonsymmetric filter, or any tap section of a DSP 10 being used as part of an a vertical filter. Enabling Csel in any tap section would block the automatic propagation of Hold-Side and Hold-Center if implemented as discussed above.

During the processing sequence, in each tap section of the DSP 10 the sum of the contents of side register 44 and old register 46 is obtained in adder 47 and then multiplied by a coefficient provided from controller 16. If desired, a different coefficient can be selected at each cycle. Note that the coefficient RAM address is the same for all tap sections of a DSP 10, on a given cycle, therefore all tap sections will be multiplying by their nth coefficient located at the RAM address n. In addition, the scale factor stored at that same RAM address (in RAM 54s) will be selected and provided to scale & clip means 14. If a tap section is unused or should not contribute to the sum on a given cycle, a zero coefficient should be stored at the appropriate RAM 54 address to eliminate the tap section from the sum.

The summing network 18 of the DSP embodiment shown in FIG. 1, is implemented for example, as a pipelined Wallace tree that sums eight 21-bit two's complement inputs to produce a 24-bit two's complement result at output 18a. Note that in this embodiment data values emerging from adder 47 and coefficients are treated as 11-bit and 10-bit two's complement values respectively in multiplier 58. Thus the product output 58a of a tap section can be regarded as a 21-bit two's complement integer or fraction without any loss of precision, and the sum of eight such values can be represented as a 24-bit two's complement value. Since the computations are done using fixed point arithmetic, the binary points for all the coefficients used with a given data set must be aligned in order for the summing logic to perform as expected.

The output of the summing network 18 can be shifted left s places (scaled by $2^s$) and clipped (in scale & clip means 14) before it appears at the output 15 of the DSP. Scale & clip means 14 consists of known circuitry for shifting and truncating data. The scale factor s used by scale & clip means 14 is in the range 0 to 7 and is read from RAM block 54 along with the coefficient as described above. After a value has been shifted, the result is clipped to minimize the damage if shifting has inadvertently produced an incorrect result through overflow or underflow.

The clipping process may be summarized as follows: The original sign bit is passed through to the output, then the next s bits are examined and discarded. If any of them differs from the sign bit, clipping forces the result to the most positive or most negative value, as shown in Table I.

TABLE I

| original sign bit | next s bit shifted out | output of clipper |
|---|---|---|
| 0 | all 0's | shifted value |
| 0 | not all 0's | most positive value (0111 . . . 111) |
| 1 | all 1's | shifted value |
| 1 | not all 1's | most negative value (1000 . . . 000) |

A scale factor of 0 effectively disables the shift and clip means 14 and the output of the summing network 18 appears unchanged at data output 15. The choice of scale factor presumably depends on where the binary points fall for the input data and coefficients, and what normalization is used for the coefficients.

Initialization sequence

At convenient intervals, multi-bit words representing control signals, scale factors and coefficients can be written into RAM block 54. This is referred to herein as an initialization sequence. These multi-bit words are then dynamically addressed and utilized by each tap section as described above, during the processing sequence. The multi-bit words are provided to controller 16 from a storage means, for example a ROM, CD, floppy disc etc or they can be calculated in real time based upon input data or desired function.

Controller 16, shown in greater detail in FIG. 2a, comprises a series of input ports, 20, 22, 24 and 26 and three data registers for temporarily storing the data provided at the input port 24. Controller 16 also comprises a counter 140 to increment the address register 130, and RAM select logic 100 which selects one or more of the RAMs in response to the address stored in address register 130.

The register-select input 26 identifies which one of three registers in the controller 16 is to be loaded. Registers 110 and 120 store the control words and coefficients which are then written into RAM block 54 respectively during the initialization sequence. Writing can occur in any cycle without disrupting the operation of the DSP, provided that the data in memory locations being used in that cycle are not changed. The lower write address portion 130b of the address register 130 selects the RAM of the RAM block into which data will be written and the upper write address portion 130a selects the address location of the selected RAM.

Data is loaded at register data input port 24. Depending on the input to the register select port 26, the register select logic means 132 selects which of the three registers is to be loaded. LSB data register 120 holds the the low order eight bits to be written to a RAM location selected by address register 130. MSB data register 110 holds the high order eight bits. When MSB data register 110 is selected by Register select input 26, the data stored in both the MSB and LSB data registers, 110 and 120 respectively, are written to the appropriate RAMs at the location stored in address register 130. After such a write operation takes place, the write address is incremented by counter 140. The incrementing will continue until the address register 130 is selected and provided with a new starting address, for example zero. The scale factors are also entered as data and stored in RAM 54s.

Table II illustrates the loading sequence. The write address cycle may be eliminated if the address to be written is one greater than the previous address. The LSB data cycle may be eliminated if that data is the same as on the previous write, but MSB data must not be selected on two adjacent cycles.

For this example assume that new data samples arrive each clock cycle and that we will not be changing coefficients on-the-fly; this means that neither Shift-Inhibit nor Hold-Side control signals need be enabled. Hold-Center may be enabled for tap section 0 on cycles 1 through 6; control logic of the DSP will propagate it to later tap sections in which Csel is not enabled on each cycle in which Shift-Inhibit is not enabled, and Transfer on cycle 7 will clear it out.

Assuming that the first data sample arrives at time 0, the following table illustrates the appropriate control signals for each cycle and the value of various registers during the cycle, as shown in Table III:

TABLE III

| cycle number | data in | Hold-Center 01234567 | Transfer 01234567 | New reg 01234567 | Old reg 01234567 | Center reg 01234567 |
|---|---|---|---|---|---|---|
| 0 | a | 00000000 | 00000000 | -------- | -------0 | -------- |
| 1 | b | 10000000 | 00000000 | a------- | -------0 | a------- |
| 2 | c | 11000000 | 00000000 | ba------ | -------0 | aa------ |
| 3 | d | 11100000 | 00000000 | cba----- | -------0 | aaa----- |
| 4 | e | 11110000 | 00000000 | dcba---- | -------0 | aaaa---- |
| 5 | f | 11111000 | 00000000 | edcba--- | -------0 | aaaaa--- |
| 6 | g | 11111100 | 00000000 | fedcba-- | -------0 | aaaaaa-- |
| 7 | h | 00000000 | 11111110 | gfedcba- | -------0 | aaaaaaa- |
| 8 | i | 00000000 | 00000000 | hgfedcba | aaaaaaa0 | hgfedcba |
| 9 | j | 00000000 | 00000000 | ihgfedcb | aaaaaaa0 | ihgfedcb |
| 10 | k | 00000000 | 00000000 | jihgfedc | aaaaaab0 | jihgfedc |
| 11 | l | 00000000 | 00000000 | kjihgfed | aaaaabc0 | kjihgfed |
| 12 | m | 00000000 | 00000000 | lkjihgfe | aaaabcd0 | lkjihgfe |

The first output appears during cycle 15.

Changing data streams and coefficients on-the-fly

Table IV illustrates the role of the side data register in changing data streams and coefficients on-the-fly. A new data stream starts through a seven tap symmetric

TABLE II

Figure 2B:
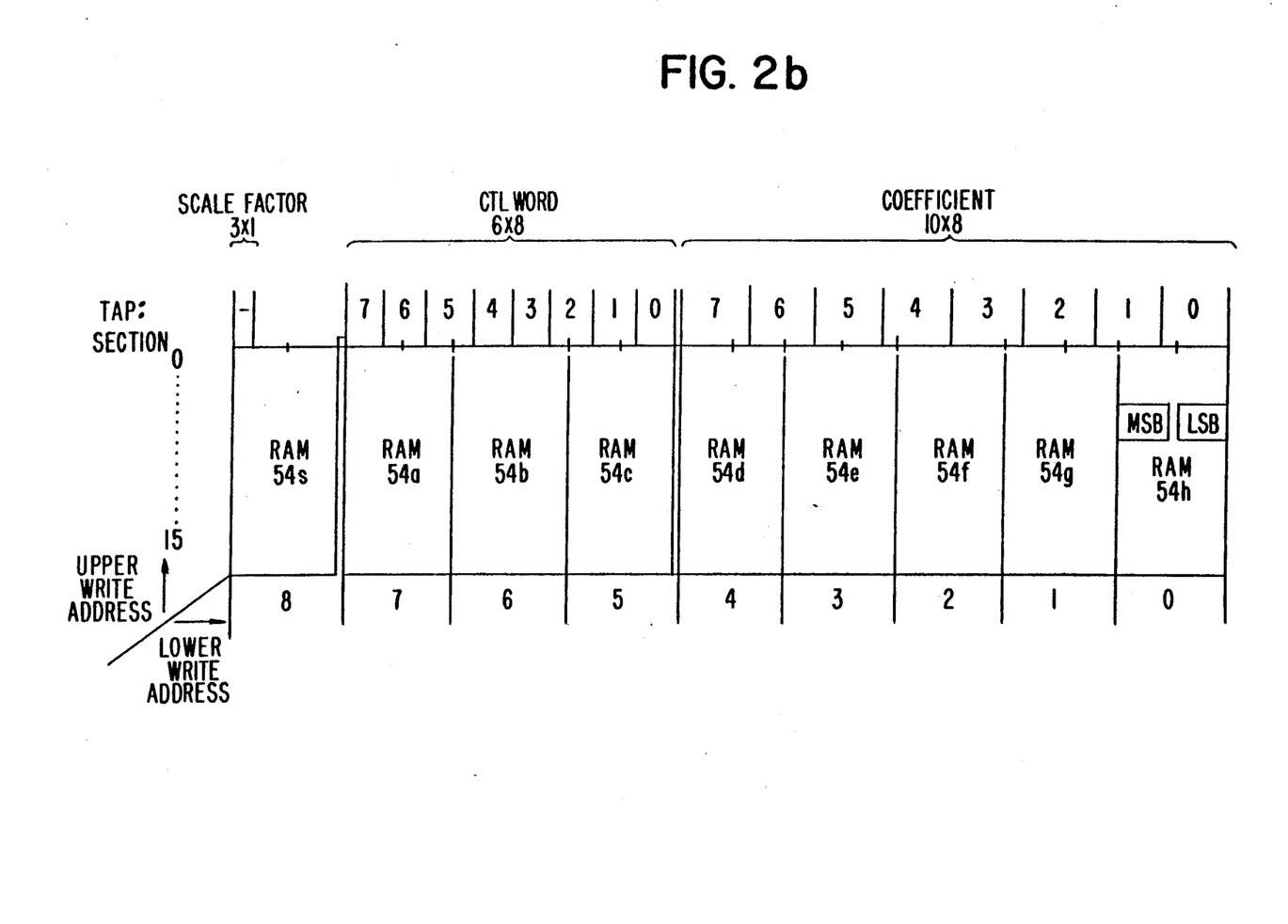

In the embodiment described herein, Register data port 24 is eight bits wide. The RAMs of RAM block 54 are sixteen bits wide, so it takes two cycles to perform each RAM write. Since there are eight tap sections in the DSP 10, each using ten bit coefficients, it takes five 16 bit write operations to load one set of coefficients. Similarly, it takes three 16 bit write operations to load one set of control words and finally one write operation to load a scale factor (only three bits are actually used). FIG. 2b is a memory map of RAM block 54.

EXAMPLES

15-tap symmetric filter

To configure DSP 10 as a fifteen tap symmetric filter, one would enable the Psel bit in tap section 0, and the Csel bit in tap section 7. This establishes tap section 0 as the input and tap section 7 as the center tap of the filter.

filter on cycle 8. Notice that although the new data is being shifted through the filter in subsequent cycles, the inputs to the arithmetic elements (the side and old data registers) are still using values from the first data set, which is being extended as if the last data value were repeated at the input.

During cycle 11 the last data value of the first data set has reached the center tap and the filtering of the first data set completes (although it will still be a few cycles more before the final output value finishes travelling through the pipeline and appears at the output). On cycle 12, the filter is switched to the new data stream and the old data registers are initialized with the first value of the second data stream. This is also the cycle in which one would change the coefficient set if so desired.

TABLE IV

| cycle number | data in | Hold Center 0123 | Trnsfr 0123 | Hold Side 0123 | New 0123 | Old 0123 | Center 0123 | Side 0123 |
|---|---|---|---|---|---|---|---|---|
| 0 | a | 0000 | 0000 | 0000 | ---- | ---0 | ---- | ---- |
| 1 | b | 1000 | 0000 | 0000 | a--- | ---0 | a--- | a--- |
| 2 | c | 1100 | 0000 | 0000 | ba-- | ---0 | aa-- | ba-- |
| 3 | d | 0000 | 1110 | 0000 | cba- | ---0 | aaa- | cba- |
| 4 | e | 0000 | 0000 | 0000 | dcba | aaa0 | aaa- | dcba |
| 5 | f | 0000 | 0000 | 000 | edcb | aaa0 | aaa- | edcb |
| 6 | g | 0000 | 0000 | 0000 | fedc | aab0 | aaa- | fedc |
| 7 | h | 0000 | 0000 | 0000 | gfed | abc0 | aaa- | gfed |
| 8 | A | 0000 | 0000 | 1000 | hgfe | cde0 | aaa- | hgfe |
| 9 | B | 1000 | 0000 | 1100 | Ahgf | cde0 | Aaa- | hhgf |
| 10 | C | 1100 | 0000 | 1110 | BAhg | def0 | AAa- | hhhg |
| 11 | D | 0000 | 1110 | 0000 | CBAh | efg0 | AAA- | hhhh |
| 12 | E | 0000 | 0000 | 0000 | DCBA | AAA0 | DCBA | DCBA |
| 13 | F | 0000 | 0000 | 0000 | EDCB | AAA0 | EDCB | EDCB |
| 14 | G | 0000 | 0000 | 0000 | FEDC | AAB0 | FEDC | FEDC |

Initializing the control and coefficient memories

Tables V and VI illustrate the use of the register select 26 and register data 24 input ports to load the registers 110, 120 and 130 and RAM block 54. As indicated in Table VI, a "1" input to register select port 26 selects the LSB data register 120 for loading. A "2" input selects the MSB data register 110 and a "3" input selects the address register 130. Note the use of register-select=0 as a nop to separate cycles selecting the MSB data register 110. The MSB data register 110 holds the data present at the register data port 24 when the MSB register is selected.

The control words written to tap sections 1 through 6 will be zero; tap section 0 will have Psel enabled, and tap section 7 will have Csel enabled. Two sets of 10-bit coefficients will be written for each tap section:

TABLE V

| sec | set 0 | set 1 |
|---|---|---|
| 7 | 0000000000 | 0100000000 |
| 6 | 0010000000 | 0001000000 |
| 5 | 0001000000 | 0000100000 |
| 4 | 0000100000 | 0000010000 |
| 3 | 0000010000 | 0000001000 |
| 2 | 0000001000 | 0000000100 |
| 1 | 0000000100 | 0000000010 |
| 0 | 0000000010 | 0000000001 |

TABLE VI

| cycle number | reg sel | reg data | Write Address | LSB | Comments |
|---|---|---|---|---|---|
| 0 | 3 | 00000000 | xxx | xxx | Clear write Address |
| 1 | 1 | 00000010 | 00000000 | xxx | Setup Sec-0<7:0> in LSB reg |
| 2 | 2 | 00010000 | 00000000 | 00000010 | Write Sec-1<5:0>, Sec-0<9:8> |
| 3 | 1 | 10000000 | 00000001 | 00000010 | Setup Sec-2<3:0>, Sec-1<9:6> |
| 4 | 2 | 00000000 | 00000001 | 10000000 | Write Sec-3<1:0>, sec-2<9:4> |
| 5 | 1 | 00000100 | 00000010 | 10000000 | Setup Sec-3<9:2> |
| 6 | 2 | 00100000 | 00000010 | 00000100 | Write Sec-4<7:0> |
| 7 | 1 | 00000000 | 00000011 | 00000100 | Setup Sec-5<5:0>, Sec-4<9:8> |
| 8 | 2 | 00000001 | 00000011 | 00000000 | Write Sec-6<3:0>, Sec-5<9:6> |
| 9 | 1 | 00001000 | 00000100 | 00000000 | Setup Sec-7<1:0>, Sec-6<9:4> |
| 10 | 2 | 00000000 | 00000100 | 00001000 | Write Sec-7<9:2> |
| 11 | 1 | 00000010 | 00000101 | 00001000 | Setup Ctl-1<1:0>, Ctl-0<5:0> |
| 12 | 2 | 00000000 | 00000101 | 00000010 | Write Ctl-2<3:0>, Ctl-1<5:2> |
| 13 | 1 | 00000000 | 00000110 | 00000010 | Setup Ctl-3<5:0>, Ctl-2<5:4> |
| 14 | 2 | 00000000 | 00000110 | 00000000 | Write Ctl-5<1:0>, Ctl-4<5:0> |
| 15 | 1 | 00000000 | 00000111 | 00000000 | Setup Ctl-6<3:0>, Ctl-5<5:2> |
| 16 | 2 | 00000100 | 00000111 | 00000000 | Write Ctl-7<5:0>, Ctl-6<5:4> |
| 17 | 0 | xxx | 00001000 | 00000000 | Nop |
| 18 | 2 | 00100000 | 10000000 | 00000000 | Write scale = 1 in word 0 |
| 19 | 3 | 00010000 | 10000001 | 00000000 | Address word 1 |
| 20 | 1 | 00000001 | 00010000 | 00000001 | Setup Sec-0<7:0>in LSB reg |
| 21 | 2 | 00001000 | 00010000 | 01000010 | Write Sec-1<5:0>, Sec-0<9:8> |
| 22 | 1 | 01000000 | 00010001 | 01000010 | Setup Sec-2<3:0>, Sec-1<9:6> |
| 23 | 2 | 00000000 | 00010001 | 10000000 | Write Sec-3<1:0>, Sec-2<9:4> |
| 24 | 1 | 00000010 | 00010010 | 00000000 | Setup Sec-3<9:2> |
| 25 | 2 | 00010000 | 00010010 | 00000000 | Write Sec-4<7:0> |
| 26 | 1 | 00000000 | 00010011 | 00000000 | Setup Sec-5<5:0>, Sec-4<9:8> |
| 27 | 2 | 00000000 | 00010011 | 00000000 | Write Sec-6<3:0>, Sec-5<9:6> |
| 28 | 1 | 00000100 | 00010100 | 00000000 | Setup Sec-7<1:0>, Sec-6<9:4> |
| 29 | 2 | 00100000 | 00010100 | 00000000 | Write Sec-7<9:2> |
| 30 | 1 | 00000010 | 00010101 | 00000000 | Setup Ctl-1<1:0>, Ctl-0<5:0> |
| 31 | 2 | 00000000 | 00010101 | 00000010 | Write Ctl-2<3:0>, Ctl-1<5:2> |
| 32 | 1 | 00000000 | 00010110 | 00000010 | Setup Ctl-3<5:0>, Ctl-2<5:4> |
| 33 | 2 | 00000000 | 00010110 | 00000000 | Write Ctl-5<1:0>, Ctl-4<5:0> |
| 34 | 1 | 00000000 | 00010111 | 00000000 | Setup Ctl-6<3:0>, Ctl-5<5:2> |
| 35 | 2 | 00000100 | 00010111 | 00000000 | Write Ctl-7<5:0>, Ctl-6<5:4> |
| 36 | 0 | xxx | 00011000 | 00000000 | Nop |
| 37 | 2 | 00000000 | 00011000 | 00000000 | Write scale = 0 in word 1 |

The inputs and outputs of the first and last tap sections are made available on parallel data pins so that two or more DSPs can be cascaded to form much longer symmetric or asymmetric filters.

When two or more DSPs are cascaded, an additional DSP may be used as a parallel adder to combine the partial sums output by the cascaded DSPs. Up to 19 bits of each partial sum can be included in the final sum by using two parallel input tap sections to accept disjoint fields of each partial sum, and setting the coefficients on those tap sections to compensate for their weights in the adder.

The present invention also comprises a processor arrangement which can process MAC signals such as those disclosed in co-pending applications U.S. Ser. Nos. 077,557 filed July 24, 1987; 271,136 filed Nov. 14, 1988 and 353,353 filed May 17, 1989, all of which are incorporated by reference herein.

In MAC transmission systems, a television signal, for example one derived from a HDTV source, is digitally processed to derive a plurality of video components, for example luminance (Y) signals, chrominance signal components (I and Q or U and V) and auxiliary signal components for example, line difference signals, all of which are further processed to provide for transmission of a wide band, high quality television signal over a lower bandwidth channel. These processed components are converted to analog signals and transmitted in time multiplexed form as the MAC signal. The HDMAC-60 signal described has a television line period which is twice the length of a conventional line period. An HDTV source signal is divided into component signals which are transmitted in such a fashion that those components necessary to derive a television signal compatible with conventional television systems can be derived from every MAC line and those components which can be combined to create an HDTV display at an HDTV receiver, are transmitted as groups of MAC lines. Appropriate memory means are then used at a decoder to store the components transmitted in time multiplexed form, so that they can be properly interpolated to form a television display.

Figure 3:
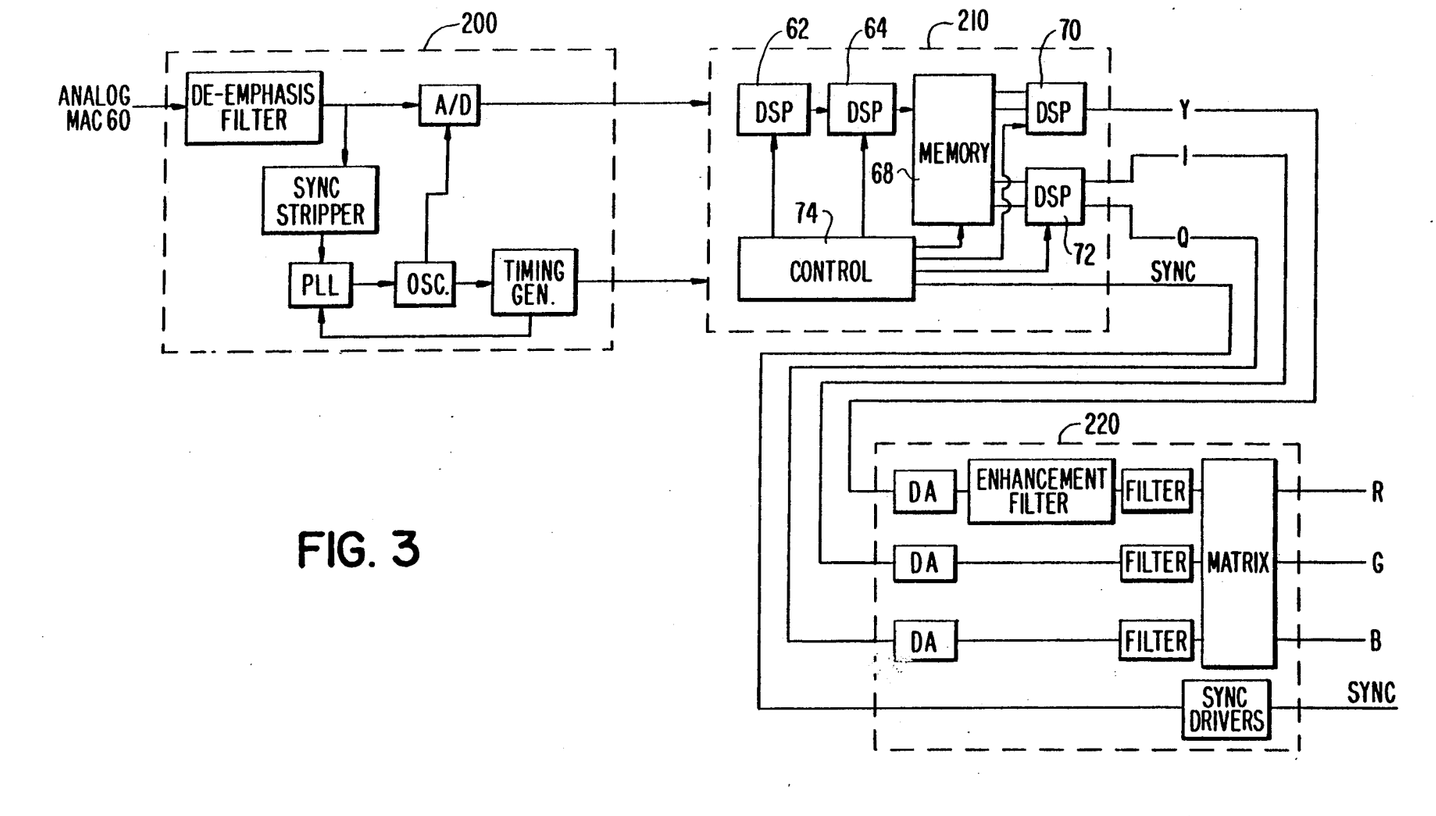
FIG. 3 is a block diagram of one embodiment of a MAC decoder comprising the invention.

FIG. 3 describes an HDMAC 60 decoder. A HDMAC signal which is derived, processed and transmitted as taught by the '557 application, is received, A/D converted and filtered to compensate for preemphasis processing which took place at the encoder, by receiving block 200. Processing block 210 comprises a plurality of DSPs which each utilize a plurality of stored coefficients and control words to operate in specific fashion for each of the signal components provided by the MAC signal. A timing signal is derived from the sync signal transmitted as part of the MAC signal. Control means 74 stores the sequence of values (addresses, coefficients, control words and scale factors) and the timing signals necessary for the initialization sequence for DSPs 62, 64, 70 and 72 as described previously. Control means 74 also consists of programmable logic, timing and memory means to store and sequentially select RAM addresses to coefficient select port 20 and control word select port 22 for the respective RAMs of each DSP, and for memory means 68, at the appropriate times relative to the incoming signal components of the MAC signal.

For some of the signal components, compression or expansion is needed during the encoding process in order to match the frequency of that component to the available channel bandwidth. This is normally done by sampling at one clock frequency and playing back at another clock frequency with the result that a number of independent clock signals are needed to restore the components at the decoder. The clock generation circuitry is consequently complex. The present invention comprises a MAC decoder in which the MAC signal is received and converted to digital signal components by receiver block 200. Each of the signal components are then provided to the processor arrangement shown in block 210, which comprises circuitry needed to compress/expand and further process the signal each components. Known systems utilize different processing paths for each component. By using the processor arrangement of dynamically configurable DSPs however, the decoder has fewer circuit paths (resulting in a circuit which is faster and smaller and easier to implement on a chip, i.e. LSI) and less complex timing requirements due to the use of a DSP configured as a resampler, as discussed below.

Figure 4:
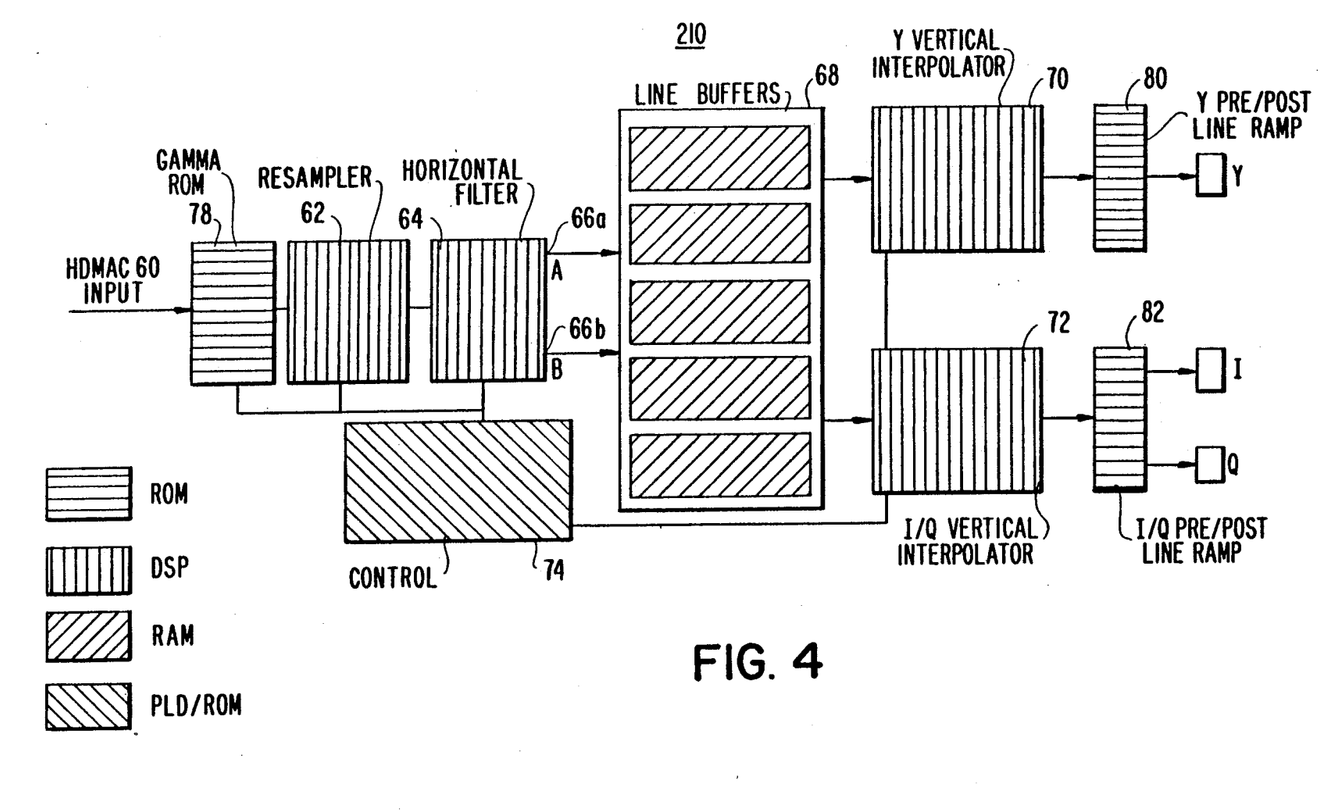
FIG. 4 is a block diagram of the processor arrangement of FIG. 3.

Block 210 is shown in greater detail in FIG. 4. The digitized samples of the MAC signal components are processed through a gamma ROM 78 which adjusts for gamma on a sample by sample basis. The ROM 78 is configured like a "look up table" storing a number of gamma corrected values. For each sample value input to ROM 78, a corresponding gamma corrected value is used as the output from ROM 78. The signal components thus processed are then fed to a resampler 62.

Resampler 62 eliminates the complex clock circuitry needed to compensate for decompression and compression done at the encoder. The resampler 62 is a non-symmetric filter whose coefficients may change each clock cycle to provide output values equivalent to the signal component as it was originally derived from the HDTV source prior to any compression or expansion at the decoder. The DSP of the present invention is suited to accomplish this task because its coefficients can change at the necessarily rapid rate, i.e. as often as each cycle.

The resampler 62 can be, for example, an eight tap non-symmetric filter whose coefficients change with each clock cycle. If used, for example, to decode a wideband luminance signal from 1700 samples to 990 samples, it is clocked at 38 MHz and control means 64 coordinates when valid samples are present at the output of the filter during resampling (only nine output samples are valid for every sixteen input samples). Thus, this is a 9 to 16 resampler which can be used to decode a wideband luminance component as described in the '557 application.

In a similar fashion, a symmetric horizontal filter 64 is configured from a DSP which is used to filter signal components. For example, wideband luminance component Y3 is filtered to provide just the higher energy component Y3H at output 66b. Y3 is provided in an unfiltered but delayed fashion at output 66a.

Figure 5A:
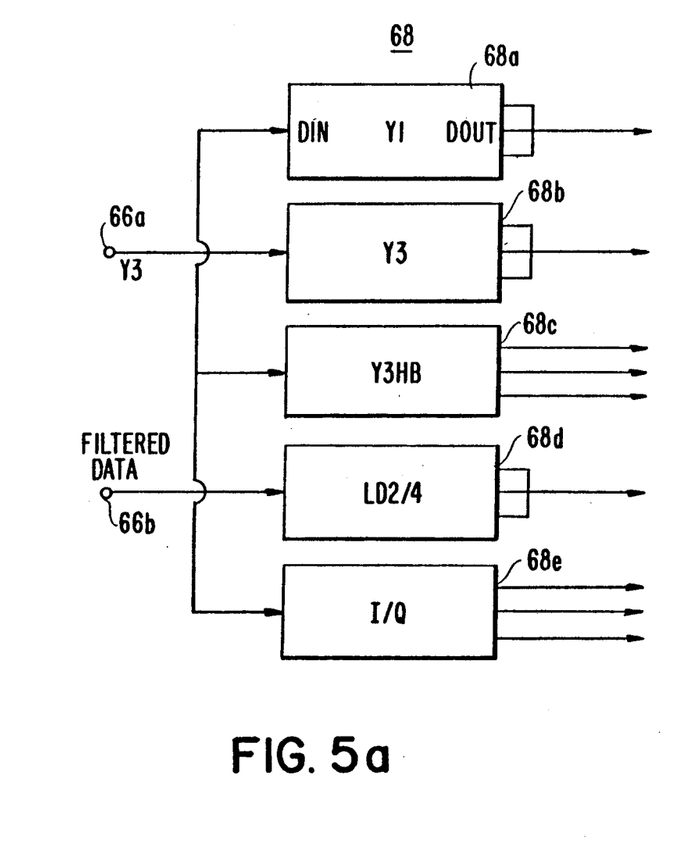
FIG. 5a is a block diagram of the line buffer portion of the processor arrangement of FIG. 4.
Figure 5B:
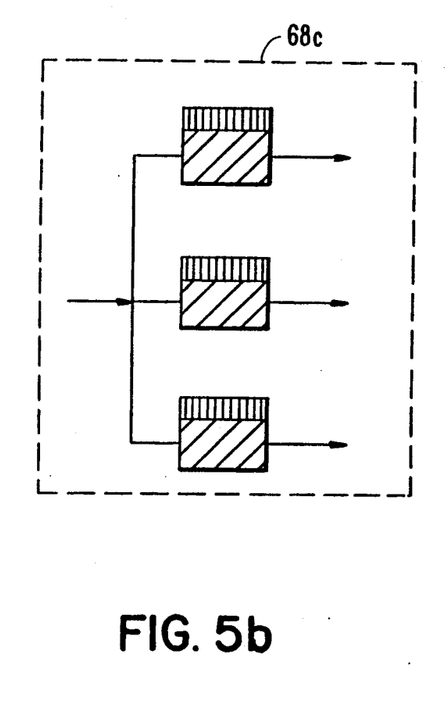

As described in the '557 application, the individual components components must be delayed in time so that they can be properly recombined prior to being converted into an RGB signal in block 220. In order to do this, each must be delayed in time and properly restored to recombine the original luminance and chrominance signals from which they were derived from the HDTV source. In the present invention, this is done by taking the filtered luminance, line difference and chrominance components and the unfiltered luminance components and storing them in respective line buffers of memory means 68. The detail of the line buffers 68a–68e is shown more clearly in FIG. 5a. As shown in FIG. 5b each of the line buffers consists of three independently addressed memories so that one memory can hold a current line, a second memory can hold an old line, while the third memory can be written with incoming data. This provides for the most general case where two memories may be read while the other is being written. Y1 can represent a luminance component which is limited in bandwidth in accordance with the MAC channel bandwidth limitation, i.e. no compression/expansion is used at the encoder. Y3 represents a luminance signal which has been expanded to allow transmission of its wide bandwidth. Line buffers 68a-68e are provided with Y1, Y3, Y3H, line difference components LD2/4 and chrominance components I/Q respectively. It is optional that instead of storing Y3 as raw data in buffer 68b, Y3 could also be filtered to yield a Y3 component having a bandwidth comparable to Y1 (i.e. Y3L) and stored in memory means 68. In the present case, however, Y3L is derived in vertical interpolator 70 by subtracting Y3H from Y3. All of the stored and derived luminance components are interpolated into a single luminance signal Y vertical interpolator 70. In this example, the vertical interpolator 70 is a DSP configured as a five tap symmetric filter to filter the LD2/4 components and five parallel input ports of the DSP are used to vertically interpolate the Y1, Y3, Y3H and the filtered LD2/4 signals. Similarly, the chrominance components I and Q are provided by line buffer 68e to I/Q vertical interpolator 72. The sequence into the I/Q vertical interpolator is 1 Q I X where X is a "don't care" signal and is used for both signals in a time multiplexed fashion.

The Y portion of the restored television signal passes from Y interpolator 70 through ramping ROM 80. Similarly the I/Q passes from I/Q interpolator 72 through ramping ROM 82. These components are then demultiplexed.

Like the Gamma ROM 78, ramping ROMs 80 and 82 are configured as "look up tables" which output ramped values in place of input samples. They ramp the data up to and down from initial or final values (for example, blanking level) on a line to prevent transients in later analog stages for example, HDNTSC encoders, RGB monitors, etc.

Although specific embodiments of the present invention have been shown and described, it will be understood that various modifications may be made without departing from the spirit of this invention.

We claim:

1. A digital signal processing apparatus for processing data, said apparatus having a data port for receiving a plurality of input signals and a processed data output for providing a processed data output signal, said apparatus comprising:
    a) a controller comprising:
        i. means for storing a plurality of coefficients and a plurality of control words; and
        ii. means coupled to said storing means, for reading selected ones of said control words and said coefficients;
    b) a plurality of processing sections each coupled to said data port for receiving at least one of said input signals collectively representing data to be processed, each one of said processing sections being coupled to at least one adjacent processing section so as to permit the transfer of said data between one or more of said processing sections, each processing section further comprising:
        i. a coefficient input coupled to said controller for receiving a selected coefficient, and means coupled to said coefficient input for mathematically manipulating said data within said processing section so as to provide a product data output; and
        ii. a control word input coupled to said controller for receiving a selected control word, and controlling means coupled to said control word input, for controlling the path of said data within each processing section and between adjacent processing sections, in response to said selected control word; and
    c) summing means coupled to each of said processing sections, for combining each product data output into said data output signal.

2. The apparatus of claim 1 wherein said mathematical manipulating means comprises at least one multiplier.

3. The processor of claim 1 wherein said processor sections are arranged in parallel and wherein the controlling means of at least one of said processor sections comprises:
    a) a first data input coupled to said data port;
    b) a second data input coupled to a first adjacent processor section thereby forming a first data path in a first direction;
    c) a first data output coupled to a second adjacent processor section thereby forming a second path in said first direction;
    d) a third data input coupled to said second adjacent processor section thereby forming a third data path in a second direction; and
    e) a second data output coupled to said first adjacent processor section thereby forming a fourth data path in said second direction.

4. The processor of claim 3, wherein said controlling means further comprises:
    a) a first data selector having a first input coupled to said first data input, a second input coupled to said second data input and an output coupled to the input of a first register;
    b) a second data selector having a first input coupled to said third data input, a second input coupled to the output of a second register, and an output coupled to the input of a third register;
    c) a third data selector having a first input coupled to the output of said first register and said first data output, a second input coupled to the output of said third register and said mathematical manipulating means, and an output coupled to said second data output;
    d) a fourth register having an input coupled to the output of said first data selector and an output coupled to said mathematical manipulating means; and
    wherein said first, second and third data selectors are controlled by said selected control word.

5. A digital signal processing apparatus for processing data, said apparatus having a plurality of data inputs for receiving a plurality of input signals and a processed data output for providing a processed data output signal, said apparatus comprising:
    a) a controller comprising:
        i. means for storing a plurality of coefficients and a plurality of control words; and ii. means coupled to said storing means, for reading selected ones of said control words and said coefficients;

b) a plurality of processing sections each coupled to at least one of said data inputs for receiving at least one of said input signals collectively representing data to be processed, each one of said processing sections being coupled to at least one adjacent processing section so as to permit the transfer of said data between one or more of said processing sections, each processing section further comprising:

i. a coefficient input coupled to said controller for receiving a selected coefficient, and means coupled to said coefficient input for performing linear convolution of said data within said processing section so as to provide a product data output; and ii. a control word input coupled to said controller for receiving a selected control word, and means coupled to said control word input, for controlling the path of said data within each processing section and between adjacent processing sections, in response to said selected control word; and c) summing means coupled to each of said processing sections, for combining each product data output into said data output signal.

6. The digital processing apparatus of claim 5 wherein said processing sections are digital filter sections.

7. An apparatus for decoding time multiplexed video signals comprising a plurality of digital filters, each of said digital filters comprising:

a) a controller comprising:
i. means for storing a plurality of coefficients and a plurality of control words; and
ii. means coupled to said storing means, for reading selective ones of said control words and said coefficients;

b) a plurality of filter sections each coupled to receive at least one of said video signals, collectively representing data to be processed, each one of said filter sections being coupled to at least one adjacent filter section so as to permit the transfer of said data between one or more of said filter sections, each filter section further comprising:

i. a coefficient input coupled to said controller for receiving a selected coefficient, and means coupled to said coefficient input for performing linear convolution of said data within said filter section so as to provide a product data output;

ii. a control word input coupled to said controller for receiving a selected control word, and means coupled to said control word input, for controlling the path of said data within each filter section and between adjacent filter sections, in response to said selected control word; and c) summing means coupled to each of said filter sections, for combining each product data output into said data output signal.

8. The apparatus of claim 7 further comprising a data port and wherein said digital filters are arranged in parallel and wherein the controlling means of at least one of said digital filters comprises:

a) a first data input coupled to said data port;
b) a second data input coupled to a first adjacent digital filter thereby forming a first data path in a first direction;
c) a first data output coupled to a second adjacent digital filter thereby forming a second path in said first direction;
d) a third data input coupled to said second adjacent digital filter thereby forming a third data path in a second direction; and
e) a second data output coupled to said first adjacent digital filter thereby forming a fourth data path in said second direction.

9. The apparatus of claim 8, wherein said controlling means further comprises:

a) a first data selector having a first input coupled to said first data input, a second input coupled to said second data input and an output coupled to the input of a first register;
b) a second data selector having a first input coupled to said third data input, a second input coupled to the output of a second register, and an output coupled to the input of a third register;
c) a third data selector having a first input coupled to the output of said first register and said first data output, a second input coupled to the output of said third register and said convolving means, and an output coupled to said second data output;
d) a fourth register having an input coupled to the output of said first data selector and an output coupled to said convolving means; and wherein said first, second and third data selectors are controlled by said selected control word.

* * * * *